Oct. 26, 1971    M. VERBAKEL    3,614,957
METHOD OF MANUFACTURING CIGARS
Original Filed May 6, 1968    2 Sheets-Sheet 1

INVENTOR
MARTINUS VERBAKEL

BY Smerce, Smiley, Snyder and Butrum

ATTORNEYS

Oct. 26, 1971     M. VERBAKEL     3,614,957

METHOD OF MANUFACTURING CIGARS

Original Filed May 6, 1968     2 Sheets-Sheet 2

INVENTOR

MARTINUS VERBAKEL

BY

ATTORNEYS

United States Patent Office
3,614,957
Patented Oct. 26, 1971

3,614,957
METHOD OF MANUFACTURING CIGARS
Martinus Verbakel, Eindhoven, Netherlands, assignor to Patent Machine Bouw N.V., Best, Netherlands
Original application May 6, 1968, Ser. No. 726,746, now Patent No. 3,526,231, dated Sept. 1, 1970. Divided and this application Feb. 25, 1970, Ser. No. 14,066
Int. Cl. A24b 3/14; A24c 1/30, 3/00
U.S. Cl. 131—20 A
4 Claims

ABSTRACT OF THE DISCLOSURE

First and second supply means are provided for feeding lengths of binder strip tobacco and wrapper strip tobacco. Conveyor means simultaneously transports the strips in flat-wise superimposed relationship. Guide means is provided for adjusting the lateral overlap of each of the strips with respect to one another. The guide means are adjustably mounted for movement in the direction of the width of each strip. First gluing means is provided for gluing the strips together along the interface thereof. Means is provided for depositing plugs of scrap tobacco on the binder strip and means is provided for simultaneously wrapping the superimposed strips transversely around such plugs to overlap opposite marginal edges of the strips. Second gluing means is provided for gluing an overlapping marginal zone of one of the wrapped strips to form a substantially cylindrical rod of tobacco product. Means is provided for then cutting this product into predetermined lengths.

CROSS-REFERENCE TO RELATED APPLICATION

The present application is a division of copending U.S. application Ser. No. 726,746, filed May 6, 1968, now U.S. Pat. No. 3,526,231, granted Sept. 1, 1970.

BACKGROUND OF THE INVENTION

The invention relates to a method to manufacture cigars in which first a cylindrical rod of unlimited length consisting of a filler of scrap tobacco, a binder strip of sheet material extending in the longitudinal direction of said rod and bent transversely round said filler of scrap tobacco and a wrapper strip of sheet material surrounding said binder strip of sheet material is produced by a composite rod producing machine, the double envelope of said rod being kept in shape by glue, and thereupon pieces of a given length are cut off from said rod.

A composite rod producing machine, in which the said method is used, is disclosed in the German utility model 1,927,143. In this machine first a rod consisting of a filler of scrap tobacco and a binder strip of sheet material extending in the longitudinal direction of the rod and bent transversely round said filler of scrap tobacco is produced. Thereupon, a wrapper strip of sheet material is wound helically round said rod and fixed by glue throughout its entire length in a narrow marginal zone in a second part of this machine. This machine is actually a double machine. It is complicated and it has the additional disadvantage that the device for applying the wrapper must be dismantled when the new reel with wrapper sheet material has to be put therein. Moreover, the disadvantage is encountered that in the places where the helical overlapping of the wrapper crosses the overlapping of the binder extending in the longitudinal direction of the rod, local thickenings are produced.

SUMMARY OF THE INVENTION

The invention has for its object to provide a method for the manufacture of cigars having a binder and a wrapper with the rod producing process which can be carried out by a much simpler machine. It consists in that the wrapper strip of sheet material is fed into the rod producing machine together with and lying under the binder strip of sheet material and the two strips of sheet material are simultaneously bent traversely round the filler of scrap tobacco. In order to carry out this method the known rod producing machines for the manufacture of cigar bunches or mono-leaf cigars, consisting of scrap tobacco and a single leaf need only be amplified with a simple addition which is adapted to feed the wrapper strip together with the binder strip into the machine.

Feeding the binder strip and the wrapper strip together into the machine can be carried out in different ways. If it must be avoided that too many layers of sheet material come to lie on each other which could make the shaping of the tapered ends of the cigars difficult, a method may be used, in which for the binder, a strip having a width equal to the circumference of the maximum cross-sectional area of the rod of scrap tobacco is used and for the wrapper, a strip having such a width as to guarantee that marginal zones thereof overlap each other after the bending process is used and in which at least the overlapping marginal zones of the wrapper strip are glued together. In that case at the most three layers of sheet material come to lie on each other and only the wrapper has to be provided with glue.

Zones having more than two layers of sheet material can be avoided entirely, when for the binder, a strip having a width equal to the circumference of the maximum cross sectional area of the rod of scrap tobacco is used and for the wrapper, a strip having a width equal to the circumference of the maximum cross-sectional area of the rod of scrap tobacco surrounded by the binder strip is used, and furthermore, when the two strips of sheet material are fed into the rod producing machine in a transverse offset relation and the wrapper strip is glued with narrow zones adjacent its longitudinal edges to the binder strip. This object can also be realized, when for the binder, a strip having a width which is a marginal zone of given width smaller than the circumference of the maximum cross-sectional area of the rod of scrap tobacco is used and for the wrapper, a strip having such a width as to guarantee that marginal zones thereof having a width which is at the most equal to that of the missing marginal zone of the binder strip, overlap each other after the binding process is used and furthermore, when the two strips are fed into the rod producing machine with their longitudinal axes coinciding with each other and the overlapping marginal zones of the wrapper strip are glued together.

In order to prevent with certainty that the binder strip and the wrapper strip are transversely shifted in respect of one another during the treatment in the rod producing machine, these strips may be locally glued together before they are fed into the rod producing machine.

For carrying out the method according to the invention a rod producing machine may be used which comprises, as is known per se, a scrap tobacco feeding device, an endless conveying belt for moving a strip of binder sheet material of unlimited length in its longitudinal direction and for the further transport of said strip together with the scrap tobacco deposited thereon by said scrap tobacco feeding device, means for bending said binder strip transversely round said scrap tobacco, means for the supply and the provision of a strip of wrapper sheet material of unlimited length surrounding the scrap tobacco and the binder strip, means for glueing the sheet material formed as an envelope and surrounding the scrap tobacco to keep the formed cylindrical rod of unlimited length consisting of a filler of scrap tobacco, a binder and a wrapper closed and a cutting device for cutting off pieces of a length suitable for the cigars to be manufactured from said rod, but in which, in accordance with the invention, the means for the supply of the wrapper strip are constructed and arranged for feeding the wrapper strip longitudinally together with the binder strip and lying between the binder strip and the conveying belt into the machine and the means for bending the binder strip transversely round the scrap tobacco are also used to bend the wrapper strip transversely round the scrap tobacco and the binder strip. By the addition of a special holder for a reel carrying the stock of wrapper strip and by using simple guiding members for the supply of the wrapper strip, the rod producing machines which are already in use for the manufacture of cigar bunches can be so modified in a simple manner as to manufacture cigars provided with a binder and a wrapper.

Since it has to be possible to lay the binder strip and the wrapper on each other in different ways depending upon how they are applied and glued together before they are bent round the scrap tobacco, the machine may be advantageously provided, in front of the conveying belt, with a guiding plate for the binder strip and a guiding plate for the wrapper strip, at least one of said guiding plates being mounted for horizontal adjustment at right angles to the direction of movement of the conveying belt. In order to fix the relative positions of the two strips before they are bent to make an envelope, a glueing device adapted to supply one of the two srtips of sheet material locally with glue on the side facing the other strip of sheet material may be mounted in the rod producing machine in front of the conveying belt.

The invention also relates to cigars manufactured by the methods according to the present invention.

DESCRIPTION OF THE PREFERRED EMBODIMENTS

Figure 1:
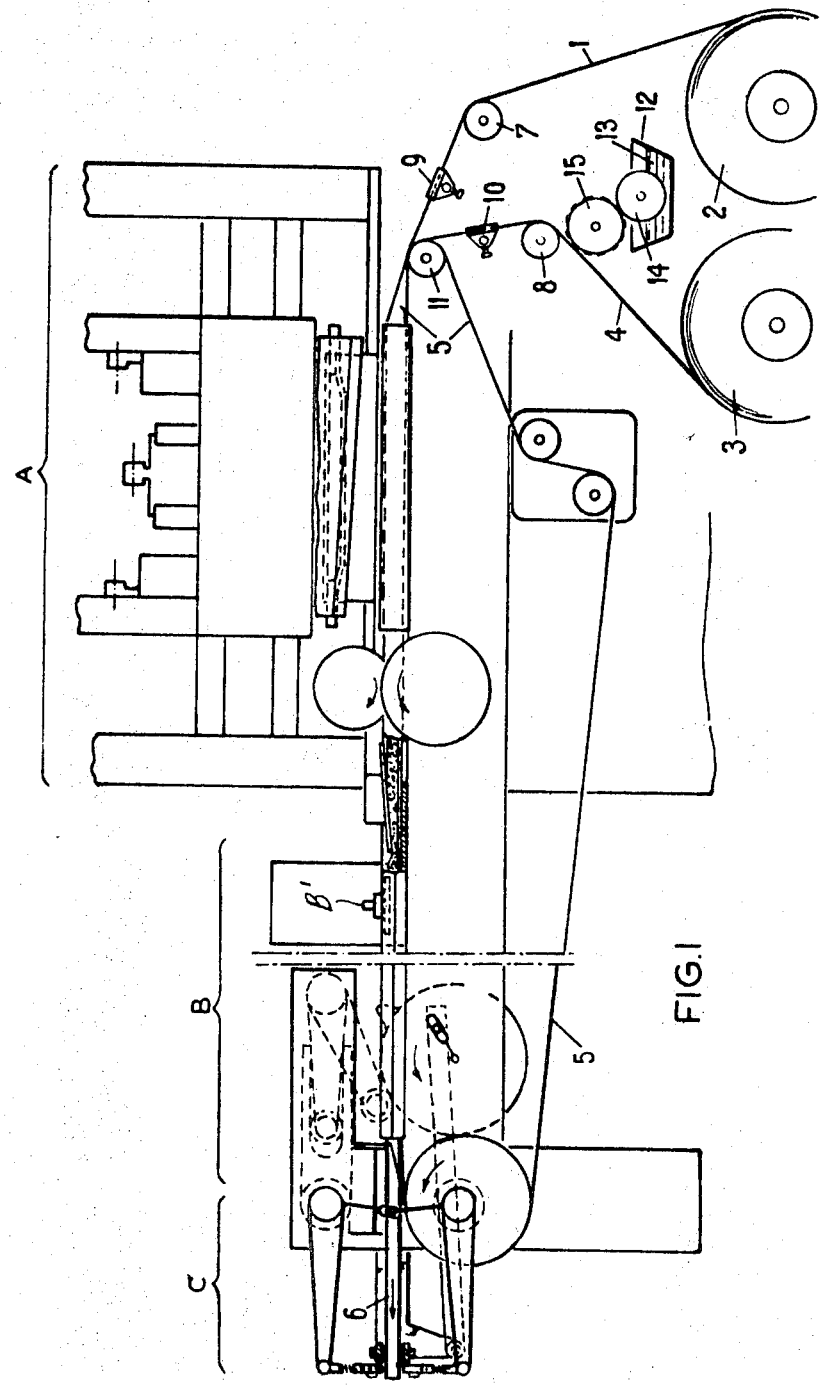
FIG. 1 is a front elevation of a rod producing machine according to the invention.

In the drawing of FIG. 1, A is a scrap tobacco feeding device, B are means for bending and glueing two strips of band tobacco around the filler of scrap tobacco, and C is a cutting device.

The scrap tobacco feeding device A is adapted to deposit the scrap tobacco either in an uninterrupted flow, as is known in machines for the manufacture of cigarettes, or in measured, if desired preformed portions, as is known in the machines for the individual manufacture of cigar bunches, onto a longitudinally moved strip of binder tobacco material 1 of unlimited length for the binder of the cigars to be manufactured. This binder strip 1, which is drawn from a reel 2 is moved, together with and lying on a strip of binder tobacco material 4 of unlimited length coming from a second reel 3 and used for the wrapper of these cigars, by an endless conveying belt 5, first through the said scrap tobacco feeding device A to take up the scrap tobacco and thereupon together with the scrap tobacco through the means B, in which the binder strip 1 and the wrapper strip 4 are simultaneously bent around the scrap tobacco. In the device B provided with the means B', the envelopes of material are glued, in such a manner as to produce a rod 6 provided with a closed cylindrical envelope of unlimited length. Thereafter, pieces of given length are cut off from said rod 6 by the cutting device C. By further treatment, as for instance in a pressing operation, said pieces are shaped into cigars of the desired shape.

The scrap tobacco feeding device A, the means B for bending the binder and wrapper strips, the glueing device and the cutting device C are already used in machines for making cigarettes, in machines for the normal manufacture of cigars and/or in the known rod producing machines, and they are sufficiently known so that they will not be described further.

The binder strip 1 and the wrapper strip 4 are first passed over guiding rollers 7, 8, thereupon passed over individual guiding plates 9, 10 mounted for horizontal adjustment at right angles to the direction of movement of the strips 1, 4 and thereafter passed together over the guiding roller 11 of the conveying belt. The guiding plates 9 and 10 are adapted to adjust the binder and wrapper strips in the right relative positions before they arrive on the conveying belt 5. In order to maintain these positions with certainty during the further treatment a glueing device is provided which consists of a trough 12 containing glue 13, a roller 14 to take up glue and a roller 15 to give off glue. By means of said glueing device, the wrapper strip can be provided with either a dotted line or with an uninterrupted line of glue. If the provision of glue in advance is not necessary, the glueing device 12-15 may be omitted.

Figure 2:
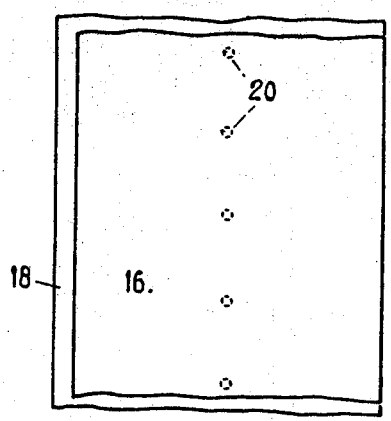
FIG. 2 is a plan view on a somewhat larger scale of a piece of binder strip lying on a piece of wrapper strip.
Figure 3:
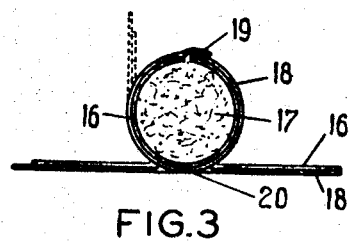
FIG. 3 is a cross-sectional view of the two strips shown in FIG. 2, and bent around a filler of scrap tobacco.

FIGS. 2-7 illustrate the ways in which the strips of band tobacco are preferably formed and positioned one upon the other. In FIGS. 2 and 3 the binder strip 16 has a width which is just sufficiently large to surround the rod of scrap tobacco 17. Thus, this binder strip has no overlapping portions and it lies freely round the scrap tobacco. However, around the binder strip 16, a wrapper strip 18 is bent, of which the marginal zones overlap each other and are glues together at 19. In this embodiment at the most three layers of tobacco material come to lie on each other. The two strips of tobacco material 16, 18 are fed together into the rod producing machine in the manner shown in FIG. 2, and, if desired, are glued together by a dotted line of glue 20 just before they enter this machine.

Figure 4:
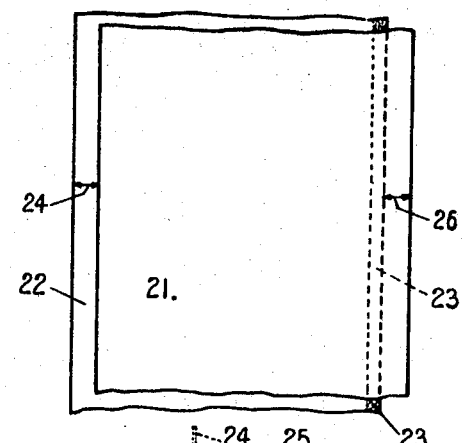
FIG. 4 is a plan view on a somewhat larger scale of a piece of binder strip lying in a different way on a piece of wrapper strip.
Figure 5:
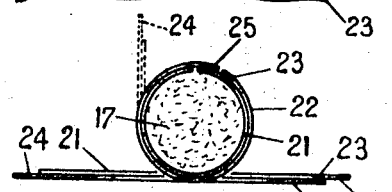
FIG. 5 is a cross-sectional view of the two strips shown in FIG. 4, and bent around a filler of scrap tobacco.

When the method shown in FIGS. 4 and 5 is carried out the two strips 21 and 22 have substantially equal widths and they are just sufficiently wide to surround the rod of scrap tobacco 17 and said rod enclosed by the binder strip 21, respectively. Consequently, there are no overlapping portions, so that the double envelope enclosing the rod of scrap tobacco and formed by the binder strip and the wrapper strip has nowhere more than two layers. The strips 21 and 22 are fed into the machine in transversely shifted positions and they are glued together in advance by a first zone of glue 23. After the two strips have been partially bent round the scrap tobacco, the second margina zone 24 of the wrapper strip is provided with glue, so that the projecting marginal zone 24 of the wrapper strip 22 can be glued at 25 on the protruding marginal zone 26 of the binder strip 21.

Figure 6:
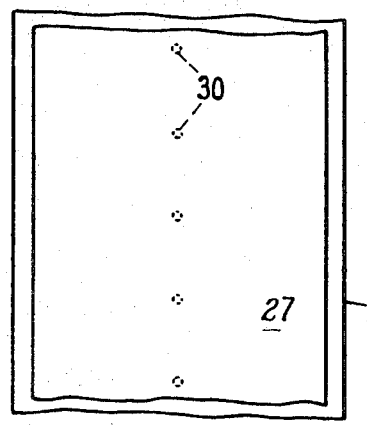
FIG. 6 is a plan view on a somewhat larger scale of a piece of binder strip lying in a third way on a piece of wrapper strip, and, FIG. 7 is a cross-sectional view of the two strips shown in FIG. 6 and bent around a filler of scrap tobacco.
Figure 7:
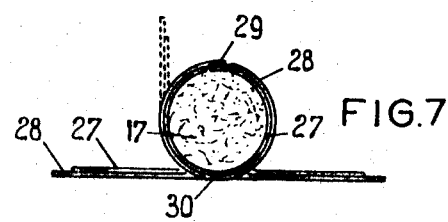

Also the embodiment shown in FIGS. 6 and 7 gives a cigar which is nowhere surrounded by more than two layers of band tobacco. Therein the binder strip 27 has such a width as to partially enclose the rod of scrap tobacco 17 throughout its circumference leaving a gap of given width. The wrapper strip 28 has a width which is sufficient to enclose the rod of scrap tobacco 17 and the binder strip with overlapping marginal zones, the width oft he overlapping zones being at the most equal to the width of the gap in the binder strip. The overlapping marginal zones of the wrapper strip 28 are glued together at 29 and they come to lie over said gap. Also, in this case, the two strips of band tobacco 27, 28 may be glued together by a dotted line of glue 30, before they are fed into the rod producing machine, so that they are kept at their relative positions during the bending thereof around the scrap tobacco.

What is claimed is:

1. The method of manufacturing cigars comprising, conveying from separate supply means indefinite lengths of binder strip tobacco and wrapper strip tobacco of predetermined width in flat-wise superimposed relationship, guiding said strips such that at least one longitudinal marginal edge of said wrapper strip is exposed beyond the corresponding edge of said binder strip, forming compressed scrap tobacco plugs of predetermined length and depositing the plugs in a compressed state onto said binder strip with the axes of said plugs substantially aligned with one another and extending substantially parallel with longitudinal axes of said strips, each plug having a circumferential dimension slightly less than the width of said superimposed strips, simultaneously wrapping said superimposed strips transversely around said plugs to overlap opposite marginal edges of the superimposed strips, glueing the overlapping marginal zone of said wrapper strip to the overlapped marginal zone of one of said wrapped strips to form a substantially cylindrical rod of tobacco product including wrapper and binder strips containing longitudinally aligned plugs therewithin, and cutting said rod of tobacco product into predetermined length at points between adjacent plugs.

2. The metho od as defined in claim 1, including the additional step of supplying one face of one of said strips with glue at a point in advance of the point at which said strips are conveyed in flat-ware superimposed relationship for glueing said strips to one another along the interface therebetween.

3. The method as defined in claim 1, wherein said strips are guided by guide means engageable with each of said strips and being adjustably mounted for movement in the direction of the width of each strip.

4. The method as defined in claim 1, wherein said strips are guided by guide means comprising a pair of guiding plates, each of which engages one of said strips at a point disposed in advance of the point where said strips are conveyed in flat-wise superimposed relationship, at least one of said plates being mounted for adjustment at substantially right angles to the longitudinal axis of the associated strip.

References Cited

UNITED STATES PATENTS 2,866,465  12/1958  Bunzl et al. _____ 131—69 X

FOREIGN PATENTS 961,362   6/1964  Great Britain _____ 131—20 A
1,021,039  2/1966  Great Britain _____ 131—20 A SAMUEL KOREN, Primary Examiner J. F. PITRELLI, Assistant Examiner U.S. Cl. X.R.

131—66 R, 69